(12) United States Patent
Bulka et al.

(10) Patent No.: US 7,287,046 B2
(45) Date of Patent: Oct. 23, 2007

(54) METHOD AND SYSTEM OF COMPACTING SPARSE DIRECTORIES IN A FILE SYSTEM

(75) Inventors: Dov Bulka, Raleigh, NC (US); Ashok Ramakrishnan, Morrisville, NC (US); Phillip Ray Hinton, Jr., Raleigh, NC (US); Eric Wagner, Raleigh, NC (US)

(73) Assignee: EMC Corporation, Hopkinton, MA (US)

( * ) Notice: Subject to any disclaimer, the term of this patent is extended or adjusted under 35 U.S.C. 154(b) by 369 days.

(21) Appl. No.: 10/260,945

(22) Filed: Sep. 30, 2002

(65) Prior Publication Data

US 2004/0064483 A1   Apr. 1, 2004

(51) Int. Cl.
*G06F 17/30* (2006.01)

(52) U.S. Cl. .................. 707/204; 707/203; 707/205

(58) Field of Classification Search ............... 707/204, 707/200, 100, 202, 203, 205
See application file for complete search history.

(56) References Cited

U.S. PATENT DOCUMENTS

| | | | |
|---|---|---|---|
| 5,008,820 A | 4/1991 | Christopher, Jr. et al. | |
| 5,151,989 A | 9/1992 | Johnson et al. | |
| 5,390,318 A | 2/1995 | Ramakrishnan et al. | |
| 5,649,156 A | 7/1997 | Vishlitzsky et al. | |
| 5,666,532 A | 9/1997 | Saks et al. | |
| 5,742,817 A | 4/1998 | Pinkoski | |
| 5,745,778 A | 4/1998 | Alfieri | |
| 5,778,430 A | 7/1998 | Ish et al. | |
| 6,014,667 A | 1/2000 | Jenkins et al. | |
| 6,023,706 A * | 2/2000 | Schmuck et al. | 707/200 |
| 6,049,850 A | 4/2000 | Vishlitzsky et al. | |
| 6,094,706 A | 7/2000 | Factor et al. | |
| 6,192,408 B1 | 2/2001 | Vahalia et al. | |
| 6,314,437 B1 | 11/2001 | Starek et al. | |
| 6,314,493 B1 | 11/2001 | Luick | |
| 6,332,158 B1 | 12/2001 | Risley et al. | |
| 6,370,549 B1 | 4/2002 | Saxton | |
| 6,453,319 B1 | 9/2002 | Mattis et al. | |
| 6,453,354 B1 | 9/2002 | Jiang et al. | |
| 6,490,666 B1 | 12/2002 | Cabrera et al. | |
| 6,658,536 B1 | 12/2003 | Arimilli et al. | |
| 6,772,163 B1 * | 8/2004 | Sinclair et al. | 707/100 |
| 2003/0200197 A1 | 10/2003 | Long et al. | |

OTHER PUBLICATIONS

"Maintaining Strong Cache Consistency in the World Wide Web" Cao & Liu, IEEE Transactions Computers, vol. 47, No. 4, pp. 445-457 (Apr. 1998).

"Class-based Cache Management for Dynamic Web Content" Zhu & Yang, IEEE INFOCOM 2001, pp. 1215-1224 (2001).

(Continued)

*Primary Examiner*—Don Wong
*Assistant Examiner*—Sheree N Brown
(74) *Attorney, Agent, or Firm*—Ward and Smith P.A.; A. Jose Cortina; R. Kevin Perkins

(57) ABSTRACT

A method and system are described for reducing search for data in a directory scheme employing hash tables. The method involves compacting directory entries in a manner in which the directory entries will gradually migrate and concentrate at the highest level hash tables which coincide with early blocks in a hash table sequence representing the directory.

9 Claims, 10 Drawing Sheets

OTHER PUBLICATIONS

Web pages for "Hash Functions for Hash Table Lookup" Jenkins, *Robert J., Jr.*, (1995-1997), http://burtleburtle.net/bob/hash/evahash.html, printed Aug 16, 2000 (9 pages), http://burtleburtle.net/bob/hash/examhash.html, printed Aug. 16, 2000 (4 pages), http://burtleburtle.net/bob/hash/doobs.html, printed Aug. 16, 2000 (10 pages), http://hissa.nist.gov.dads/HTML/hashtab.html, printed Aug. 16, 2000 (1 page), http://ccrma-www.stannford.edu/CCRMA/Software/cltl/clm/node155.html, printed Aug. 16, 2000 (5 pages).

* cited by examiner

METHOD AND SYSTEM OF COMPACTING SPARSE DIRECTORIES IN A FILE SYSTEM

BACKGROUND OF THE INVENTION

1. Field of the Invention

The invention relates to a method and system of compacting sparse directories in a file system. In a specific implementation, the invention relates to such a method and system of compacting sparse directories in a file system, in particular, in a network attached storage (NAS) device.

2. Description of the Background

In the computer industry, storage technology has evolved rapidly over the past number of years, and storage capacity has increased dramatically as the need for managing, storing and accessing large amounts of data increases with various organizations' needs.

Traditionally, such data has been managed and accessed through the creation of a file system. One of the first traditional file systems was a hierarchical structure made up of a tree of directories including a root directory and subdirectories underneath it. More specifically, a directory is a recursive structure that contains entries. Each entry is a file. A file may be a special file, called a directory file, or it may be a data file. The contents of a directory file are generated by the file system, and users generate the contents of a data file. In the remainder of this document, the term file represents both data files and directory files interchangeably.

When a file system contains a large number of files, a mechanism is required to divide the set of all files into subsets of related files. That grouping of files helps a user to navigate through what is potentially a very large collection of files. As already discussed, one of the first most popular groupings employed by file systems is the hierarchical directory structure, with the topmost node in the tree called the root directory.

Such directories organize its information through a collection of records known as directory entries, each of which represents a single file or another directory. A single directory entry contains an I-node number, entry allocation size, filename size, the filename, and padding. The I-node number is a unique file identifier. The allocation size is the space consumed by the file name plus padding. This information allows a user to compute the size, in bytes, of the directory entry. The file name length corresponds to the allocation size minus the padding size, or in other words, the actual bytes consumed by the name of the file.

Early implementations of directory files organized the directory entries as a sequential list of records. In order to find a specific directory entry, a user had to scan the list sequentially. In such systems, once directories grew to more than a few hundred files, the list concept could no longer work because of the excessive time needed to find a particular filename.

A more recent implementation for large directories, maintains files in a sequence of hash tables. A hash table is a popular technique for fast search, insert and delete operations on a large collection of records. It is a table of linked lists and has a fixed number of "buckets," each of which is the start of a single link list. Each record in the collection provides a key that will be mapped into one, and only one, of the buckets. The value of that key is referred to as the record's hash value. Thus, when searching for a particular record, the file sytem only has to inspect a single list corresponding to the record's hash value, thereby significantly cutting down on the magnitude of the search space.

Such an implementation allows for fast insert, delete and look-up of files. However, inserting a large number of files will cause the size of the directory to grow so that, if a large number of files are subsequently deleted, large regions of the directory will become empty, and it becomes time consuming to find a file because many empty regions have to be inspected during the search.

In accordance with the invention described herein, there is provided a method and system which solves the problem of the prior art, in particular when a hashing scheme is used in implementing a directory, when it is desired to compact the directory due to a large number of files having been deleted.

BRIEF SUMMARY OF THE INVENTION

In accordance with one aspect, there is provided a method of compacting sparse directories in a file system that employs a directory structure using sequential hash tables made up of blocks. The number of blocks in each hash table is equal to the number of blocks of the prior hash table in sequence, multiplied by two. The blocks in each subsequent hash table logically make up a lower level of blocks than the blocks in the prior hash table, and each block in a hash table is associated with two blocks in the following sequential hash table.

In accordance with the method, when attempting to compact a sparse directory, it is first determined whether any first predetermined block for any hash table in the directory structure contains a number of files lower than a predetermined value. Such blocks are typically at a higher level as explained hereafter. If it is determined for any first predetermined block that the number of files therein is lower than the predetermined value, a second determination is made about whether any second predetermined blocks at the next lower level contain any files therein. If any second predetermined block at the next lower level contains files therein, either all of the files are migrated from the second predetermined blocks into the corresponding first predetermined block, or as many of the files in the second predetermined block corresponding to the first predetermined blocks are migrated which are sufficient to fill the first predetermined block.

In a specific implementation, the blocks in each hash table are identified with binary values, and the next lower level blocks are matched to a higher level block by the tail of its binary number being the same as the binary number of the higher level block. Yet still further, the predetermined value can be a value indicating that the block is completely empty of files, or a value indicating that the block contains a sufficiently small number of files as to be functionally empty or "nearly empty," and thereby a target for migrating data into the corresponding higher hash block to fill that block.

BRIEF DESCRIPTION OF THE DRAWINGS

Having thus generally described the invention, the same will become better understood from the following detailed description, taken in conjunction with the drawings wherein.

DETAILED DISCUSSION OF THE INVENTION

Figure 1:
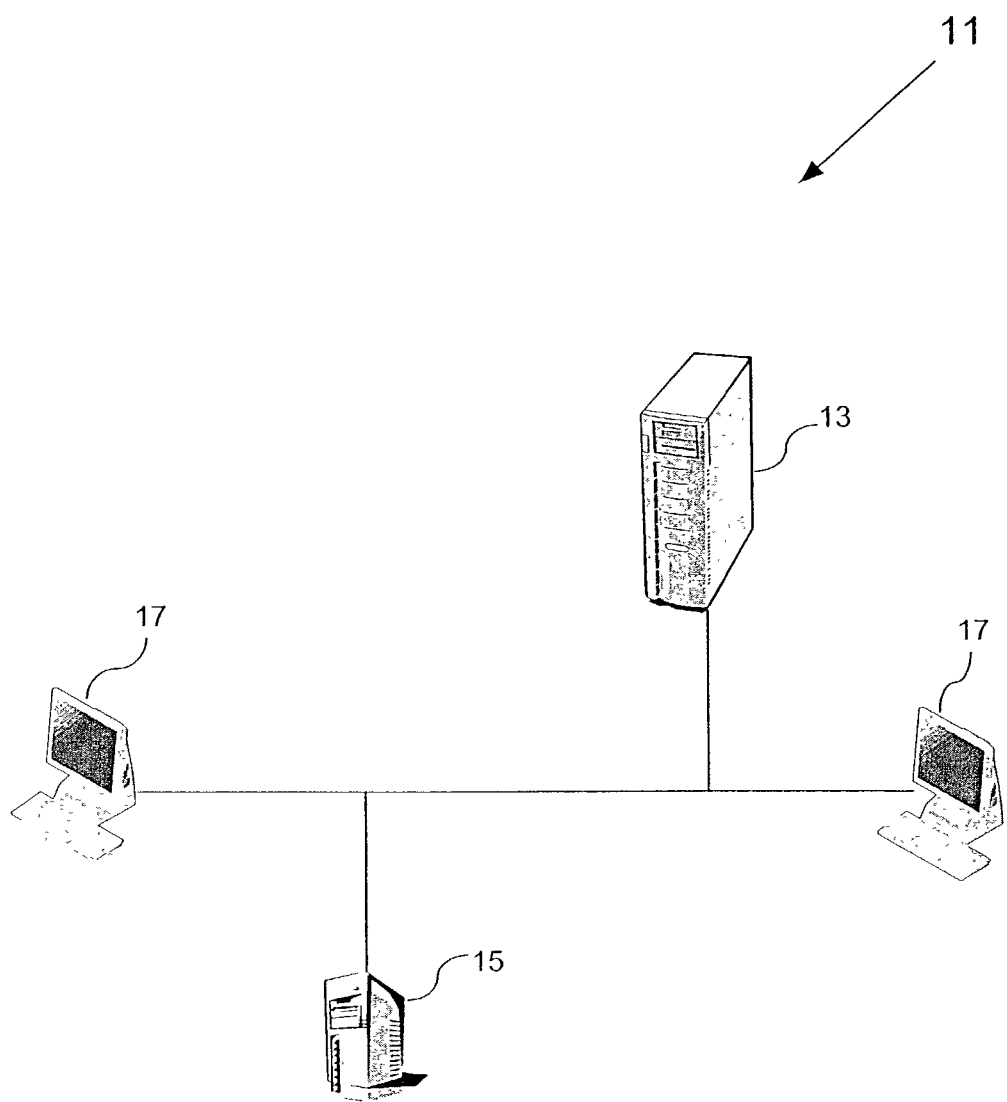
FIG. 1 is a general schematic diagram illustrating a typical network, including an attached network storage device on which the system and method may be implemented.

FIG. 1 illustrates a typical network on which the method and system described herein can be implemented. Such a network 11 may include a storage device 13 which is capable of managing, storing and operating on large volumes of data. User terminal, 17 may also be connected along with a server 15 which manages the network. In such an arrangement, the network attached device 13 serves as a large hard drive and users are allowed to access the network attached storage device 13 through the network.

While the system described herein can be implemented in network attached storage devices such as the device 13 shown in FIG. 1, it will be readily apparent to those of ordinary skill in the art that the system can also be used in other environments where large storage devices handle large volumes of data.

Figure 2:
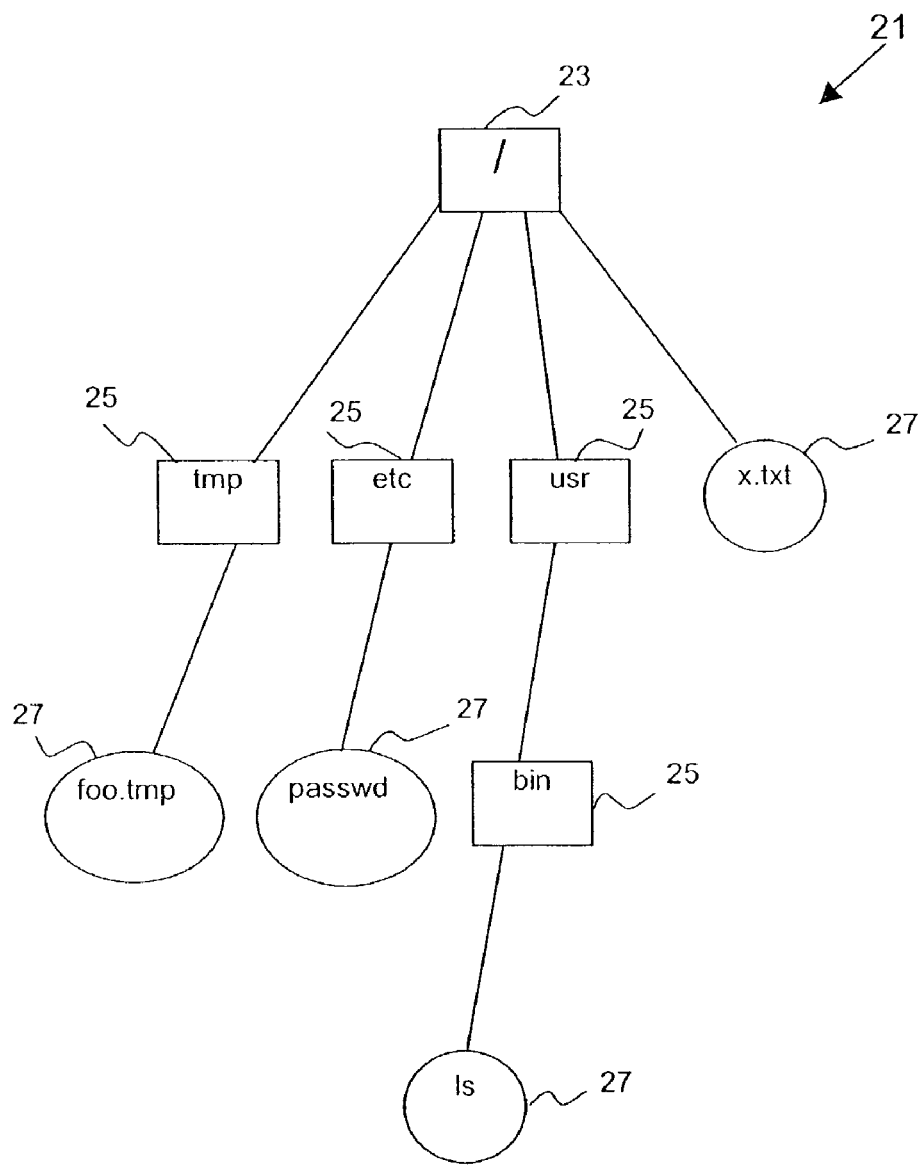
FIG. 2 is a schematic diagram illustrating a traditional hierarchical directory.

FIG. 2 illustrates a traditional hierarchical directory structure 21. The topmost node 23 in the tree is the root directory and may contain additional directory nodes or file nodes. Directory nodes 25 can be a sibling to a file node 27 as shown at the first level, and the general structure can be understood from the diagram. In such a directory implementation, the directory itself is a file that does not contain user data, but file system generated data.

Figure 3:
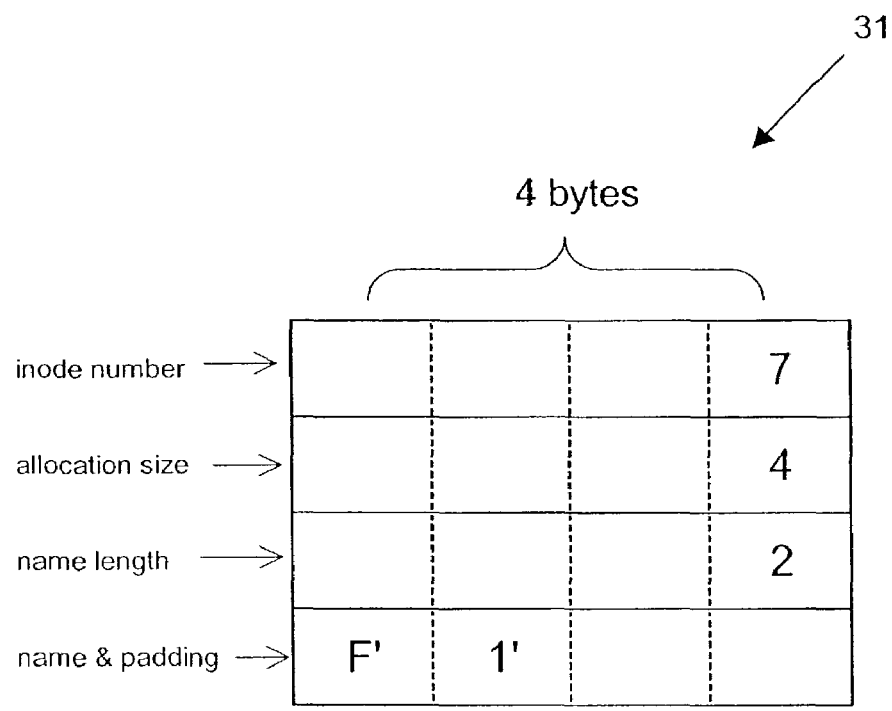
FIG. 3 is a schematic diagram illustrating a table showing fields for an example of a directory entry for directories implemented through a traditional hierarchical system as shown in FIG. 2.

FIG. 3 shows a table 31 illustrating how a directory such as that of FIG. 2 organizes its information. An example directory entry is shown corresponding to an I-node number, allocation size, name length, name and padding. The I-node number index value used to locate the file. The allocation size refers to the space consumed by the filename plus additional padding. This information allows the file system to compute the size, in bytes, of the directory entry. The file name length refers to the allocation size minus the padding, or more specifically, the actual bytes consumed by the name of the file. Finally, the fourth field is the file name plus the padding.

Figure 4:
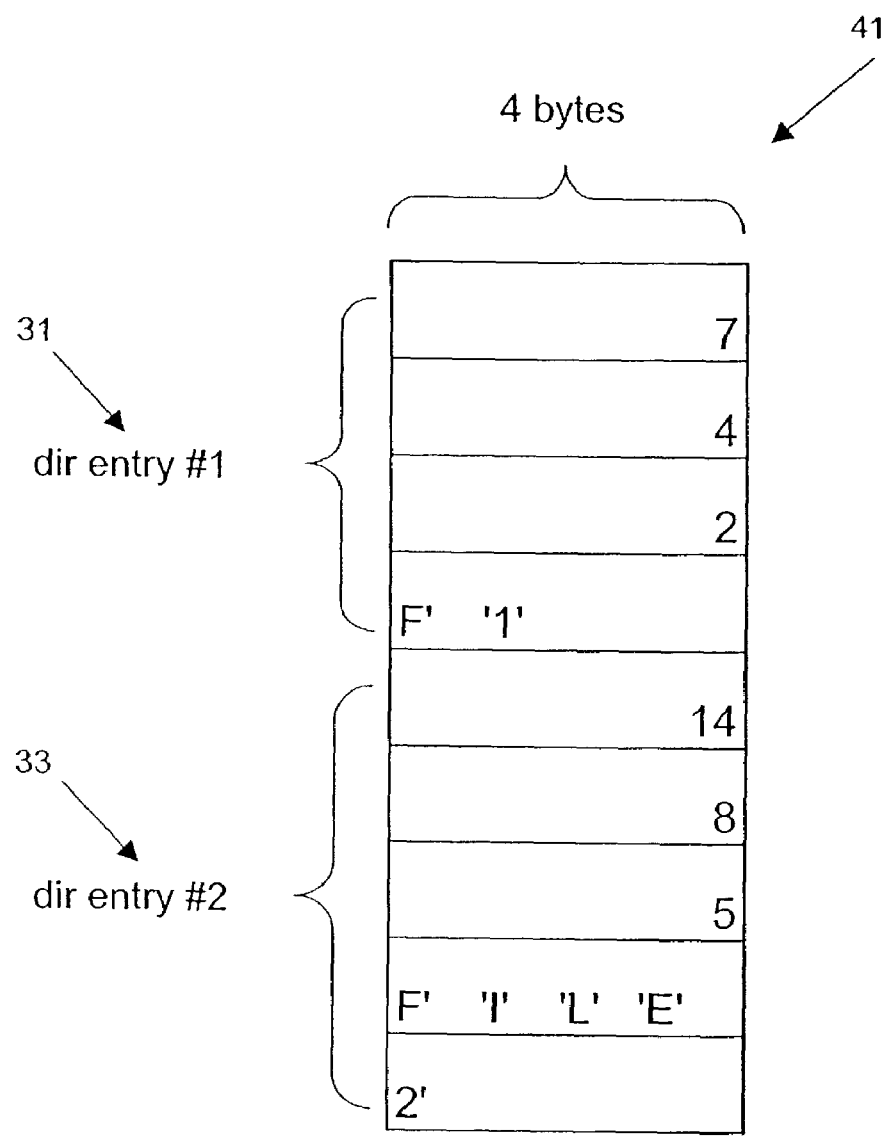
FIG. 4 schematically illustrates a specific sequential listing of records for a directory containing two files.
Figure 5:
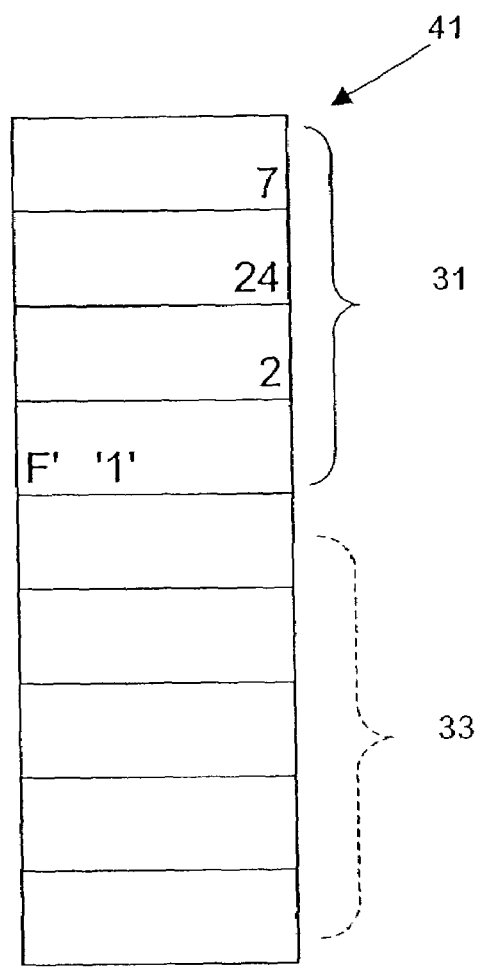
FIG. 5 is a schematic illustration similar to that of FIG. 4, but showing what the sequential listing looks like when one of the directory entries, i.e., a file, has been removed.

In such implementations of directory files, the directory entries are organized as a sequential list of records. This is shown in FIG. 4 which contains two files 31 and 33. In order to find a specific directory entry, the list is scanned sequentially inspecting one record at a time. In the event that it is desired to delete a file from a directory, the directory entry corresponding to the file is removed from the directory as illustrated in FIG. 5. The space occupied by the removed directory entry is illustrated in dotted line by the number 33 and the space previously occupied by file 33 is added to the previous directory entry 31. Thus, in this implementation, the allocation size of the directory 31 entry is 24, even though the name itself only consumed 2 bytes. As a result of the deletion, there has been provided 22 additional bytes of padding, most of which came from the deleted directory entry.

Since directories are dynamic in nature in that files are constantly added and deleted, the number of files in a directory can rise and fall dramatically. In prior implementations, when directories were implemented as lists as described, it was easy to insert and delete files, but the directories were excessively time consuming to search. Once directories grew to more than a few hundred files, the afore-described list implementation no longer effectively functions.

Figure 6:
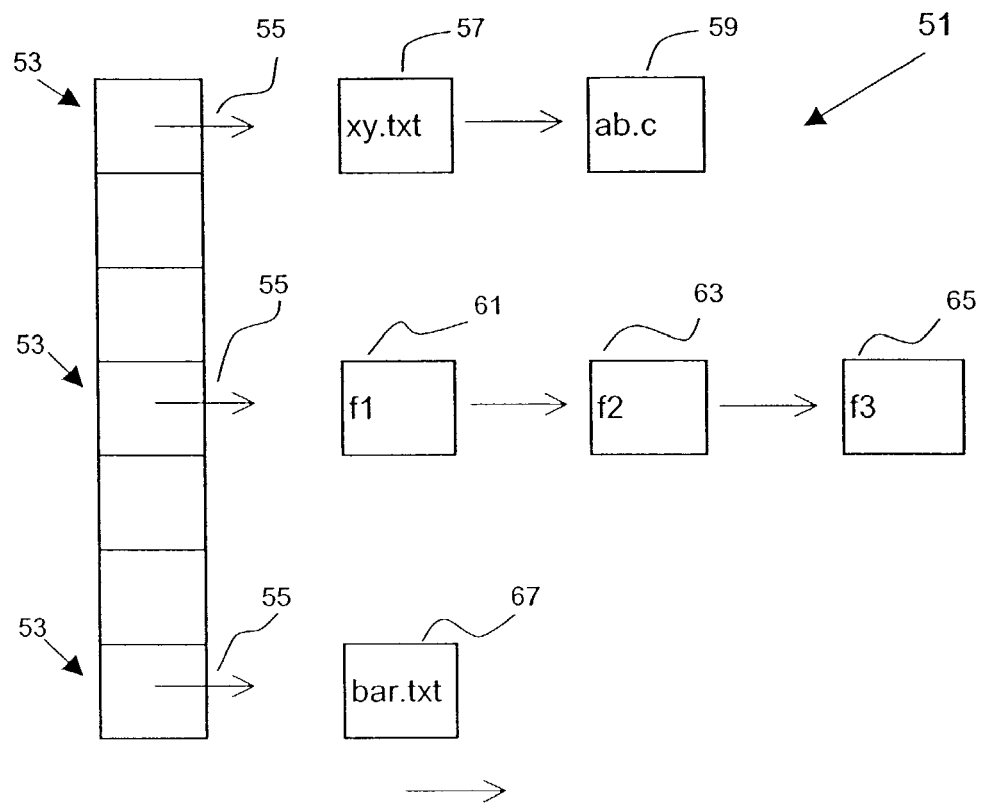
FIG. 6 illustrates an implementation of a hash table showing how each records corresponds to a file name.

As a result, there was developed an implementation for large directories to maintain the files in a sequence of what are known as hash tables as illustrated in FIG. 6.

More specifically, by a hash table is meant a technique for fast search, insertion and deletion operations on a large collection of records. The hash table is a table of lists and includes a fixed number of "buckets" corresponding to blocks in the table, each of which is the start of a single list. Each record in the collection provides a key that will be mapped into one of the buckets or slots. The value of that key is referred to as the record's hash value. Each one of the lists contains records of identical hash value, so that when searching for a particular record, a user only has to inspect a single list corresponding to the record's hash value. That significantly cuts down on the magnitude of the search space.

As illustrated in FIG. 6, there is shown a hash table 51 where each bucket 53 corresponds to a list of file name 57-67. The file name is often used to generate the hash value. As illustrated, the arrows 55 point to the start of each list of directory entries 57-67 corresponding to their respective buckets 53.

This implementation allows for fast insert, delete and look-up. While allowing for growing the size of the directory, the hash table does not allow for easily compacting of a directory once many of its files have been removed. Accordingly, there is described hereinafter a system and method which allows compacting of directories implementing a hash table system. This is important in the case where a lot of files have been deleted but the directory structure remains, and searching for a few files becomes time consuming.

Figure 7:
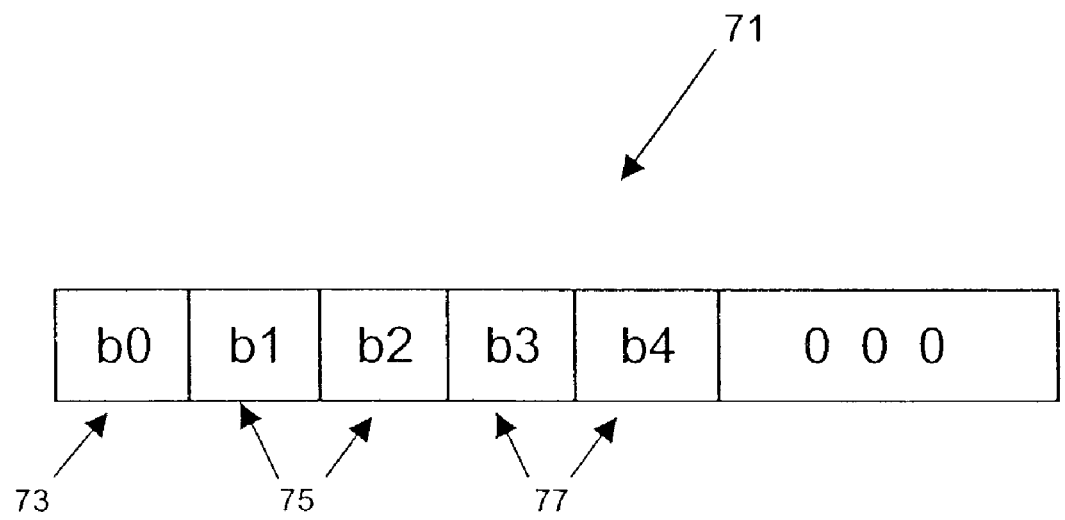
FIG. 7 illustrates one view of a directory in a hash scheme, in which the directory is a sequence of blocks, and each block contains directory entries corresponding to the names of files contained in the directory.

To understand the system and method of compacting described hereafter, it becomes important to understand that a directory and a hashing scheme can be viewed in two different ways. FIG. 7 illustrates such a directory as a sequence of blocks 71, each of which is 1024 bytes. A directory block contains directory entries corresponding to the names of the files contained in the directory. Thus, in FIG. 7, the directory is viewed as a sequence of 1 KB blocks. In such a system, if it is desired to search for a file name, if entries in every block had to be inspected, this would result in a highly inefficient search. Thus, there is imposed another structure on the sequence of blocks by grouping them in a particular way. Each group is a hash table unto itself where the directory blocks serve as hash table buckets. Thus as illustrated in FIG. 7, and discussed hereafter with reference to FIG. 8, the first hash table 73 consists of the first block B0, the second hash table 75 consists of the next two blocks, B1 and B2, and the next 77, as illustrated partially by blocks B3 and B4, includes blocks B3 and B4, but also include B5 and B6, as shown in FIG. 8.

Figure 8:
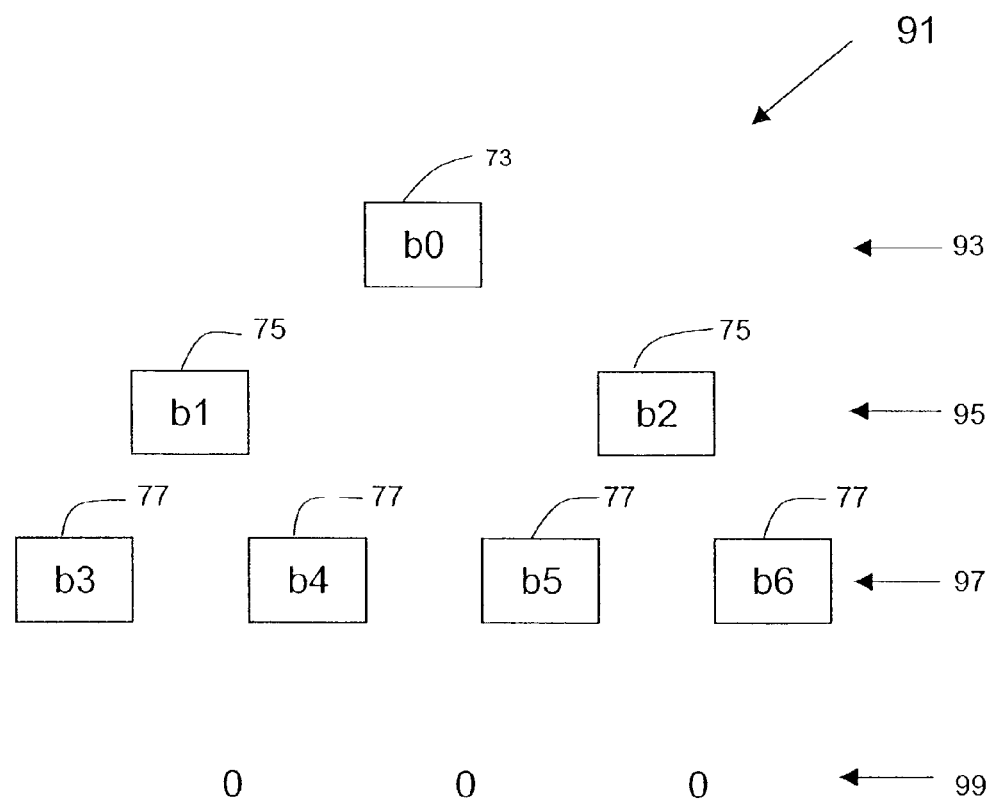
FIG. 8 is a structure implemented through the use of hash tables whereby the sequence of blocks are grouped in an unique arrangement, by level.

The arrangement of hash tables 91 shown in FIG. 8 illustrates how the hash tables are set up by levels, in this case, levels 93, 95 and 97, up to level N 99, so that the first hash table 73 is at the highest level, i.e., block B0. The next level 95, corresponds to the next hash table and includes blocks 75, i.e., blocks B1 and B2. Blocks 77, due to the next level being multiplied by two, are four blocks 77, i.e., blocks B3, B4, B5 and B6 at level 97, and so on, to the Nth level designated by the reference number 99.

Figure 9:
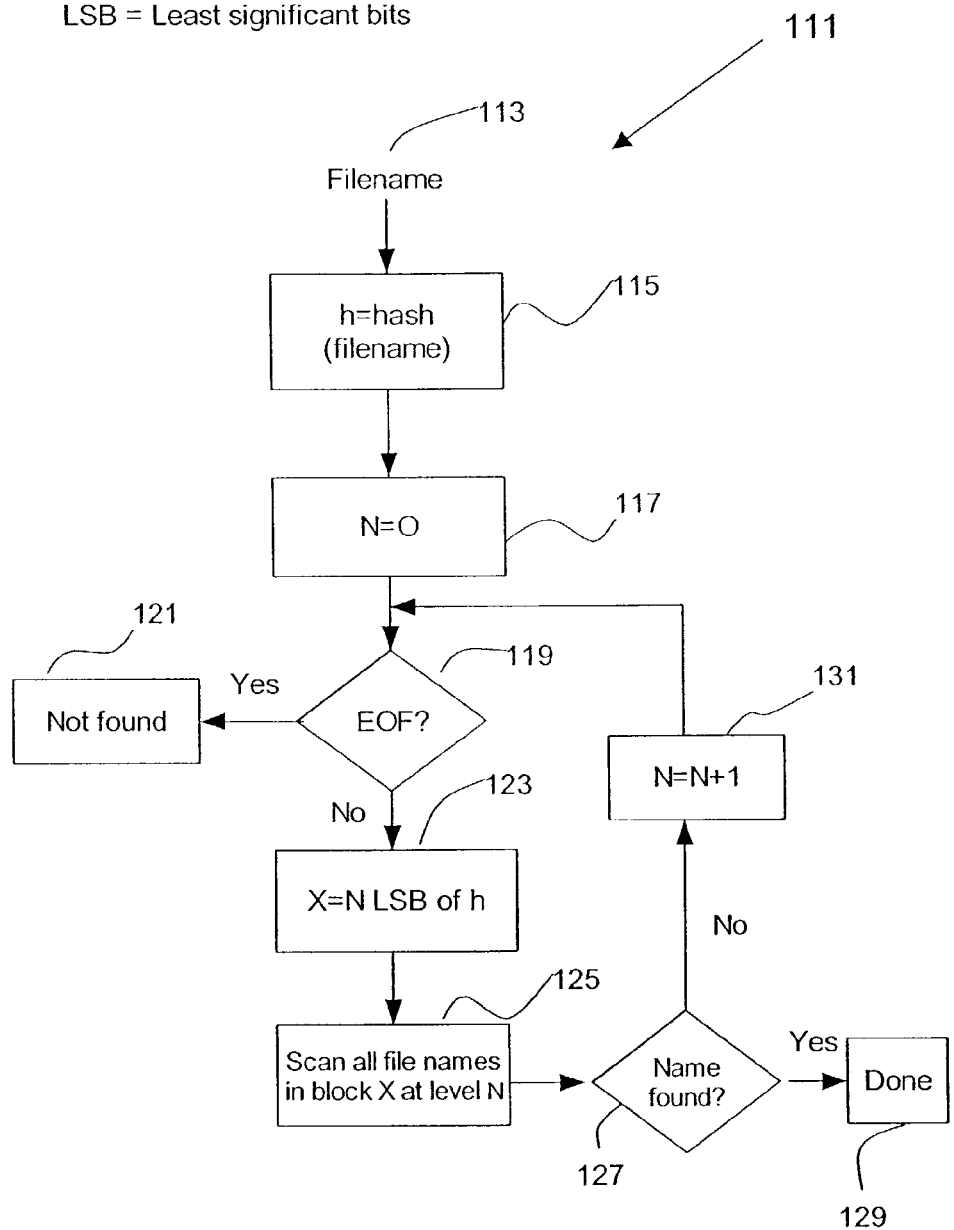
FIG. 9 illustrates how a user can search for files in the directory arrangement of FIGS. 7 and 8.

In such a system, the lookup procedure for searching for files is as illustrated in FIG. 9 by flow chart 111. In accordance with such a lookup procedure, a particular file name 113 is converted at step 115 into a hash value. This hash value will be used to hash into a single bucket in each hash table encountered in the search. At step 117 the search is commenced at the first hash table where N is equal to zero and corresponds to hash table 73 from the prior figure. At step 119 it is determined if the end of the directory has been reached. If the answer is yes, an answer is returned at step 121 indicating that it is not found. If the answer is no, at step 123 the search proceeds to the directory block number at the particular level N made up of the N least significant bits of the hash number. At step 125 all file names are scanned in this directory block, and if at step 127 the name is found, then the search proceeds and indicates that it has been found at step 129.

If the answer is no, then N is set to N+1 at step 131, and the search returns to step 119 and proceeds as previously discussed.

The following illustrates a specific implementation of such a search. For example, if the hash value is 27 and a user tries to map it to a hash table consisting of 8 buckets (where N=3), 27 in binary numbers is represented as the 11011 bit sequence. Since the hash table for N=3 has only 8 buckets, only the last three bits are relevant, i.e., 011. The sequence 011 represents bucket number 3 in the hash table. As may be appreciated, this arrangement is generalized to all hash values and all hash tables. Thereafter, the list rooted at the noted bucket is searched to find a matching entry. If the search fails to find a match in the hash table number N, then the hash table N+1 is then searched and eventually the matching file entry is found or the search reaches the end of the directory.

It will be appreciated from the previous description that the search algorithm described above is heavily dependent on the offsets of various blocks within the directory. If empty blocks are eliminated from the directory, the entire algorithm collapses. Thus, when files are deleted and blocks emptied, the blocks still remain and it is impossible to truncate the directory.

This can create a significant performance problem. For example, a directory containing 500,000 files may grow to a size of 128 MB, but when most files have been removed and the remaining files are sparsely spread over the entire 128 MB, searching for existing files will be greatly slowed by the fact that on average, a large number of blocks will have to be inspected (one per hash table) until the file is found. From the perspective of providing an illustration, consider a user that creates a large number of files in a directory, for example, hundreds of thousands of files. The user then goes in and deletes all the files but a few, and then would like to search for those few files. In such a case, it will be significantly slower for the file system to discover the file.

Figure 10:
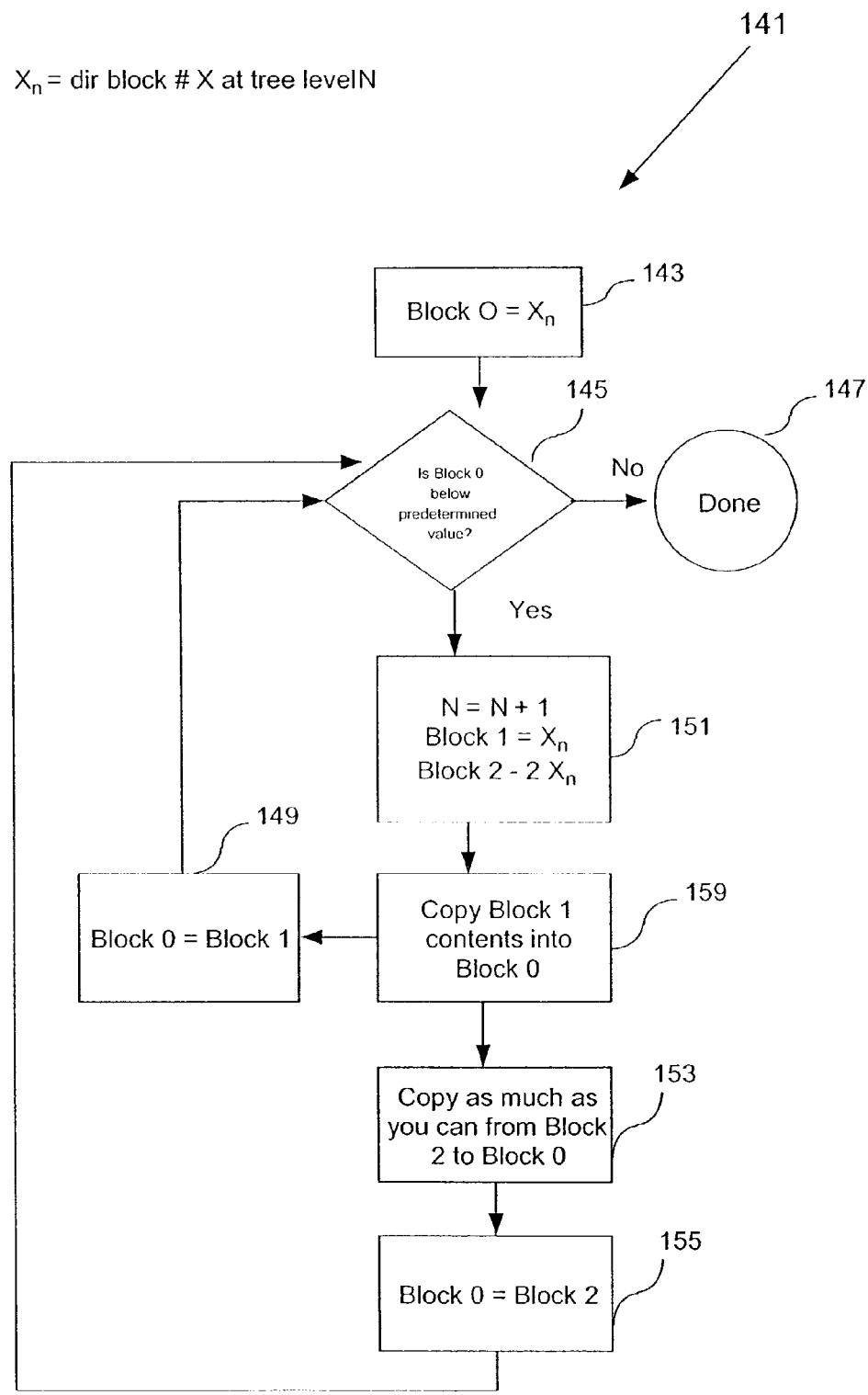
FIG. 10 is a flow chart illustrating how it is possible to compact directories when blocks are either sparse or empty, to avoid delays in searching for files when the directory has had large numbers of files deleted therefrom.

Accordingly, FIG. 10 illustrates in flow chart form the method implemented herein where it becomes possible to populate empty blocks with directory entries that currently reside in lower level directory blocks. In the specific implementation, there are exactly two blocks in a lower level whose entries can be migrated up to an empty block at the next upper level. If any of the two blocks become empty, the pull up operation continues recursively to lower level blocks, thereby guaranteeing that directory entries will eventually migrate and concentrate at the highest level hash table coinciding with early blocks in the sequence representing the directory.

FIG. 10 illustrates the flow chart 141 in the context of beginning the inquiry 143 at block 0 at the highest level, where block 0 is equal to $X_n$, which is the directory block number X at level N. At step 145 a determination is made whether the block 0 is empty or if not empty, at a predefined threshold that labels the block "nearly empty" once the space utilization of the block is below the given threshold. If the answer is no, then at step 147 the operation terminates.

If the answer is yes, at step 151, N is set to N+1 and at that level block 1 equals $X_n$ and block 2 equals $2X_n$. At step 159 all of the block 1 contents are copied into block 0. At step 149 then block 0 is set equal to block 1 and the process returns to step 145. At step 153, as much as possible from block 2 is copied to block 0, and then block 0 is set equal to block 2 at step 155 and the process returns to step 145.

By way of further understanding the flow chart, consider the case where the sixth block at the fourth level has become empty after deletion of the last entry in the block. A hash table containing eight blocks represents the fourth level. The sixth block will contain all directory entries whose hash value bit sequence ends with 101 (101 in binary equals 5, which is the sixth block if you start counting from zero). In deciding to migrate or pull up entries from two blocks in the fifth level to the empty block at the fourth level, picking the blocks from the fifth level cannot be arbitrary. The choice of blocks to migrate must preserve the integrity of the hashing scheme. More specifically the hash values of directory entries of those two source blocks in the fifth level must map to the empty target block in the fourth level. Since the target block corresponds to hash values whose tail bit sequence is 101, the source blocks on the next level will correspond to the bit sequence 1101 and 0101. Those two blocks are identified by adding a 1 and a 0 at the front of the sequence. Thus, the source blocks for the pull up operation are the sixth, i.e., 0101 is five, and fourteenth, i.e., 1101 is thirteen.

If the pull up operation results in the emptying of one of the source blocks, for example, block 1101 on the fifth level, the pull up operation can be continued recursively by making block 1101 the new target block and the new source block at the next level will be block numbers 11101 and 01101.

As may be appreciated, the single block at the top level corresponds to an empty bit sequence. To derive the bit sequence at the second level, a single bit is appended to the empty sequence, which results in the bit sequence 0 or 1. As such, both blocks of the second level correspond to the single block at the top level.

As may be appreciated, repeated application of the operation will tend to migrate all directory entries to a small number of blocks at the start of the directory thereby dramatically cutting down on the computational expense involved in searching a large number of directory blocks and reducing the number of disk I/O operations that must be performed, as well as reducing the processor cache footprint.

Having thus generally described the invention, the same will become better understood from the appended claims in which it is set forth in a non-limiting manner.

What is claimed is:

1. A method of compacting sparse directories, comprising:

conducting the method in a file system employing a directory structure which uses a sequence of hash tables made up of blocks, with the numbers of blocks in each hash table being the numbers of blocks of its prior hash table in sequence, multiplied by two, and the blocks in each subsequent hash table comprising a lower level of blocks than the blocks in the prior hash table, and with first predetermined blocks at any level associated with second predetermined blocks at the next lower level thereby defining a hashing scheme, the method further comprising;

determining whether any first predetermined block for any hash table in the directory structure contains a number of files lower than a predetermined value;

if it is determined for any first predetermined block that the number of files therein is lower than said predetermined value, determining if any second predetermined blocks at the next lower level contain any files therein, with said second predetermined blocks having hash vales corresponding to a hash value of said first predetermined block;

if any second predetermined blocks at the next lower level contain files therein, migrating files in any second predetermined blocks into its corresponding first predetermined block or as many of the files in any second predetermined block corresponding to said first predetermined block sufficient to fill said first predetermined block to thereby compact sparse directories in the file system employing a directory structure in a manner preserving the bashing schemes from level to level;

identifying the blocks in each hash table in binary values, and the blocks which are matched to correspond to each other from level to level for migrating files upwardly through levels being matched by a tail bit sequence of the lower level blocks from which files are to be migrated to an upper level block; and the first level of blocks comprising only one block, and the second Level of blocks comprising two blocks whose blocks correspond to the one block in the first level, and further comprising migrating files from the blocks in the second level to the one block in the first level when the number of files in the block in the first level is lower than said predetermined value to thereby compact sparse directories in the file system employing a directory structure; and setting each block to which directory entries are migrated, to equal the block from which directory entries were migrated.

2. The method of claim 1, wherein said predetermined value is a value indicating the block is empty of files.

3. The method of claim 1, wherein said predetermined value is a value indicating the block contains a sufficiently small number of files as to be fractionally empty.

4. A method of compacting sparse directories, comprising:

conducting the method in a file system employing a directory structure which uses a sequence of hash tables made up of blocks, with the numbers of blocks in each hash table being the numbers of blocks of its prior hash table in sequence, multiplied by two, and the blocks in each subsequent hash table comprising a lower level of blocks than the blocks in the prior hash table, and with first predetermined blocks at any level associated with second predetermined blocks at the next lower level, the method further comprising;

determining whether any first predetermined block for any hash table in the directory structure contains a number of files lower than a predetermined value;

if it is determined for any first predetermined block that the number of files therein is lower than said predetermined value, determining if any second predetermined blocks at the next lower level contain any files therein;

if any second predetermined blocks at the next lower level contain files therein, migrating files in any second predetermined blocks into its corresponding first predetermined block or as many of the files in any second predetermined block corresponding to said first predetermined block sufficient to fill said first predetermined block to thereby compact sparse directories in the file system employing a directory structure, with said correspondence between blocks at different levels being determined by a hashing scheme linking blocks from level to level; and the hashing scheme being such that the blocks in each level are identified by binary numbers, and are matched to correspond to each other from one level to the next when a binary tail of the binary number of a lower level block matches the binary number of a block at a level immediately above so as to preserve the hashing scheme, and further comprising setting each block to which directory entries are migrated, to equal the block from which directory entries were migrated.

5. The method of claim 4, further comprising, if none of said second predetermined blocks contain any files, or contain a number of files lower than said predetermined value, searching blocks at lower levels directly or indirectly associated therewith, and migrating files therefrom upwardly by level to fill the blocks at the highest level with files from associated blocks at lower levels.

6. The method of claim 4, wherein each hash table comprises a plurality of unique values, each linked to a specific file value corresponding thereto.

7. The method of claim 4, wherein two blocks from a lower level are matched to a block at an upper level.

8. The method of claim 4, wherein said predetermined value is a value indicating the block is empty of files.

9. The method of claim 4, wherein said predetermined value is a value indicating the block contains a sufficiently small number of files as to be functionally empty.

* * * * *